United States Patent [19]
Yoshida et al.

[11] Patent Number: 5,982,414
[45] Date of Patent: *Nov. 9, 1999

[54] BIDIRECTIONAL SIGNAL DISTRIBUTING SYSTEM FOR INDUCING A RELAXING FEELING

[75] Inventors: Hidekazu Yoshida; Yukio Matsumoto; Yoshio Koizumi, all of Tokyo, Japan

[73] Assignee: Pioneer Electronic Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/754,931

[22] Filed: Nov. 25, 1996

[30] Foreign Application Priority Data

Dec. 27, 1995 [JP] Japan .................... 7-351829

[51] Int. Cl.$^6$ .................................... H04N 7/14
[52] U.S. Cl. ................... 348/13; 348/6; 348/552
[58] Field of Search .................... 348/12, 13, 7, 348/584, 503, 228, 403, 473, 235, 552; 455/5.1, 4.2, 6.2; 381/2, 7, 77; H04N 7/173

[56] References Cited

U.S. PATENT DOCUMENTS

| | | | |
|---|---|---|---|
| Re. 32,785 | 11/1988 | Hirano | 601/47 |
| 3,278,676 | 10/1966 | Becker | 348/484 |
| 4,023,566 | 5/1977 | Martinmaas | 601/47 |
| 4,055,170 | 10/1977 | Nohmura et al. | 601/47 |
| 4,064,376 | 12/1977 | Yamada | 601/47 |
| 4,573,449 | 3/1986 | Warnke | 128/1 |
| 4,717,343 | 1/1988 | Densky | 434/236 |
| 4,777,529 | 10/1988 | Schultz et al. | 358/143 |
| 5,027,208 | 6/1991 | Dwyer, Jr. et al. | 358/148 |
| 5,135,468 | 8/1992 | Meissner | 600/28 |
| 5,270,800 | 12/1993 | Sweet | 348/584 |
| 5,352,181 | 10/1994 | Davis | 600/28 |
| 5,565,908 | 10/1996 | Ahmad | 348/7 |
| 5,719,635 | 2/1998 | Han | 348/552 |
| 5,734,720 | 3/1998 | Salganicoff | 380/20 |

FOREIGN PATENT DOCUMENTS 008125994   5/1996   Japan .................... H04N 7/173

*Primary Examiner*—Andrew I. Faile
*Assistant Examiner*—Reuben M. Brown
*Attorney, Agent, or Firm*—Morgan, Lewis & Bockius LLP

[57] ABSTRACT

A bidirectional signal distributing system which can use a sweet sleep system at home without exerting a burden on a subscriber so as to purchase the sweet sleep system. Luminance change frequency data and/or audio change frequency data suitable to shift to a sweet sleep state of the subscriber has been stored in a head end apparatus in the bidirectional signal distributing system. When the subscriber requests a sweet sleep function, the luminance change frequency data and/or audio change frequency data according to the subscriber provided on the head end side is read out, a predetermined video signal and/or audio signal is modulated, and the modulated signal is transmitted to the subscriber apparatus.

13 Claims, 5 Drawing Sheets

FIG.5

```
         BIDIRECTIONAL CATV SYSTEM
              -- MENU (1) --

◎ STRESS ELIMINATING MUSIC (6,18CH)
◎ MEMORY IMPROVEMENT MUSIC (25CH)
◎ SWEET SLEEP SERVICE (0CH)
(NOTE) IF YOU WANT TO LISTEN TO THE STRESS
   ELIMINATING MUSIC AND MEMORY IMPROVEMENT
   MUSIC, SERVICE IS NOW AVAILABLE IN DESIGNATED
   CHANNEL. USE TIME 16:00 - 20:00.
☆ HOW TO USE SWEET SLEEP SERVICE IS AS
   FOLLOWS:
HOW TO OPERATE
1. DESIGNATE 0CH
2. SET TIME AFTER 0CH IS DESIGNATED
3. INITIALLY INPUT START TIME AND SUBSEQUENTLY
   END TIME AS FOLLOWS:
(EXAMPLE)  21:30 START AND 22:00 END
           "INFO" 2130
           "INFO" 2200
           "INFO"
             SETTING IS FINISHED.
```

BIDIRECTIONAL SIGNAL DISTRIBUTING SYSTEM FOR INDUCING A RELAXING FEELING

BACKGROUND OF THE INVENTION

1. Field of the Invention

The invention relates to a bidirectional signal distributing system having an apparatus for promoting a subscriber's relaxation.

2. Description of Background Information

In recent years, our society has been rapidly progressed as portrayed by technological innovation, high growth of the economy, increase in population density, and so on, and the social environment around people has also rapidly been changed in association with such social progress. Due to changes in the social environment, many people ranging, for example, from business persons to school children have come to feel to be under stress in the living environments.

As mentioned above, when considering a mental stress, irrespective of the age, sex, and kind of occupation, every person is always under stress more or less somewhere in their daily living environments.

In the above-mentioned social environment, lots of apparatuses, tools, and many CDs of relaxation music or the like for the purpose of relieving or eliminating the stress or having a sweet sleep are put into market.

Actually, a person such as a worker of a late-night shop who needs to sleep in the daytime, a businessman, or the like lightheartedly uses at a rest time, for example, a room in an office building, the so-called "capsule-inn", or the like as a relaxation space in which an apparatus for the purpose of relieving or eliminating the stress or having a sweet sleep is installed.

As facilities provided for a business-use, there are facilities for many people such that apparatuses for illumination, fragrance, sound, a chair, and the like which are effective to relieve or eliminate the stress or to have a sweet sleep are suitably arranged in the whole room. There are facilities for a personal-use such as a room or box for sweet sleep. As simple facilities, a method of lending goggles which cover the eyes or the like is used.

As mentioned above, everyone receives some stress when he lives in the current society and wants to relieve or eliminate the stress. As a method of relieving or eliminating the stress, it is most healthful to sleep well in a short time, namely, to be able to have a sweet sleep and it is also useful to relieve or eliminate the stress. Generally, people can relax best at home or in their own rooms. Although it is most preferable to have a sweet sleep at home, when there is no sweet sleep apparatus, people needs to go to a relaxation room equipped with facilities to relieve or eliminate the stress which is caused because he is busy or to purchase a sweet sleeping room, a sweet sleeping box, goggles, or the like for personal use.

It is currently well known that the supply of abundant video programs, music programs, and the like has widely been spread as a service enterprise on a unit basis of a town or a city by using a bidirectional signal distributing system such as a CATV system or the like.

With the bidirectional signal distributing system, the user can select, watch, and listen to the abundant video programs at home and also can enjoy music pieces by merely calling a center of the bidirectional signal distributing system and selecting the title of a desired music piece without preparing a CD of the desired music piece by himself.

With the bidirectional signal distributing system, since each home and the center are bidirectionally connected, each subscriber can take part in a program at home. By exchanging information to/from the subscriber, a lot of data regarding desired programs, taste, and the like of the subscriber is accumulated and prepared. Thus, the programs which further satisfy the subscriber's wishes can be provided and advertised and the services can be expanded.

As mentioned above, since a demand to relieve or eliminate the stress or to have a sweet sleep is a social phenomenon, it is an object of the bidirectional signal distributing system to provide a method of solving such a demand for relieving or eliminating the stress or having a sweet sleep.

SUMMARY AND OBJECTS OF THE INVENTION

It is an object of the invention to provide a bidirectional signal distributing system in which a subscriber can use the foregoing sweet sleep system at home without imposing a burden on the subscriber to purchase a sweet sleep system.

To achieve this objective, according to the first aspect of the invention, there is provided a bidirectional signal distributing system comprising: a head end apparatus including memory means in which at least one of luminance change frequency data and audio change frequency data suitable for a shift to a sweet sleep state of a subscriber has been stored, signal generating means for generating at least one of a predetermined video signal and a predetermined audio signal, and modulating means for modulating at least one of the video signal and the audio signal from the signal generating means in accordance with at least one of the luminance change frequency data and the audio change frequency data in the memory means; and a subscriber apparatus including request signal generating means for generating a request signal to request a sweet sleeping function, wherein when the subscriber generates the request signal from the request signal generating means to the head end, the luminance change frequency data and/or audio change frequency data according to the subscriber is read out from the memory means provided on the head end side, the predetermined video signal and/or audio signal is modulated by the modulating means by the frequency data, and the modulated signal is transmitted to the subscriber.

A bidirectional signal distributing system according to the second aspect of the invention features that the modulating means causes a flash of the video signal.

A bidirectional signal distributing system according to the third aspect of the invention features that the modulating means changes a blinking frequency so as to gradually approach a frequency of the α-wave of brain waves of the subscriber.

A bidirectional signal distributing system according to the fourth aspect of the invention features that the video signal is a blue background signal, a white signal, or a still image.

A bidirectional signal distributing system according to the fifth aspect of the invention features that the modulating means of the audio signal changes the audio frequency data so as to gradually approach the frequency of the α wave of brain waves of the subscriber.

According to a bidirectional signal distributing signal according to the sixth aspect of the invention, the request signal generating means transmits a control signal which is transmitted by a key operation of a remote-control apparatus to the head end side by an out-band frequency.

According to the present invention, the bidirectional signal distributing system comprises: a head end apparatus including memory means in which at least one of luminance change frequency data and audio change frequency data suitable for a shift to a sweet sleep state of a subscriber has been stored; signal generating means for generating at least one of a predetermined video signal and a predetermined audio signal, and modulating means for modulating at least one of the video signal and audio signal from the signal generating means in accordance with at least one of the luminance change frequency data and the audio change frequency data in the memory means; and subscriber apparatus including request signal generating means for generating a request signal to request a sweet sleeping function, wherein when the subscriber generates the request signal from the request signal generating means to the head end, at least one of the luminance change frequency data and the audio change frequency data according to the subscriber is read out from the memory means provided on the head end side, and at least one of the predetermined video signal and audio signal is modulated by the modulating means in accordance with the frequency data, and the modulated signal is transmitted to the subscriber. Therefore, when the subscriber generates the request signal by the request signal generating means, at least one of the video signal and audio signal based on individual data regarding the subscriber's sweet sleep stored on the head end side can be transmitted, so that the subscriber can enter into the sweet sleep state at home.

BRIEF DESCRIPTION OF THE DRAWINGS

FIG. 5 is a diagram showing a menu picture plane in the embodiment of the invention.

DETAILED DESCRIPTION OF THE PREFERRED EMBODIMENT

Figure 1:
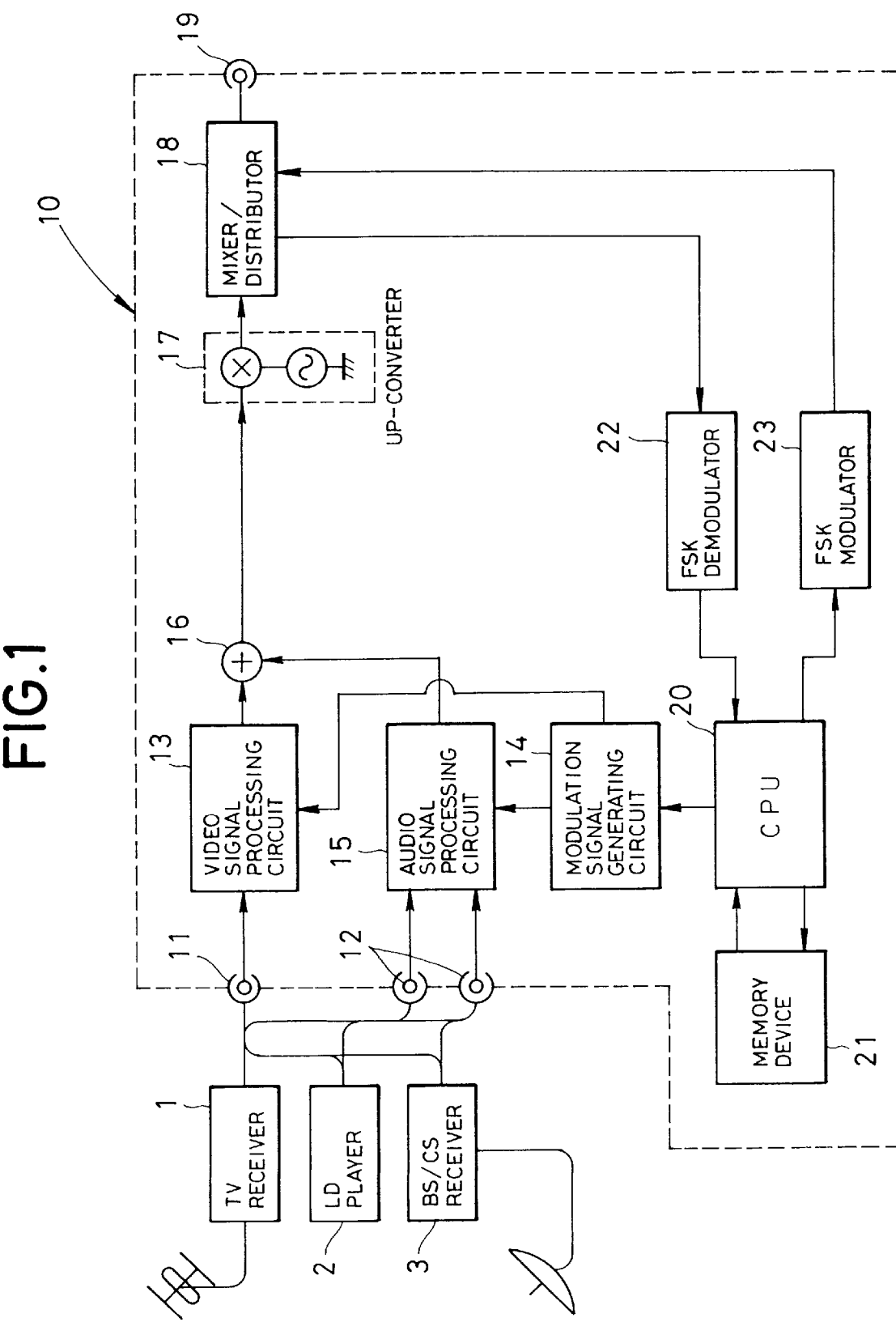
FIG. 1 is a block diagram of an apparatus on a head end side (a center apparatus) in the embodiment of the invention.

FIG. 1 is a block diagram of a controller on a head end (a center) side of a bidirectional CATV system as a bidirectional signal distributing system of the invention. As shown in FIG. 1, in a controller 10 of the center, video signals are supplied from a TV receiver 1, an LD player 2, a BS/CS receiver 3, and the like as video equipment to a video input terminal 11. Audio outputs of those video equipment are also supplied to an audio input terminal 12. The video signal supplied to the video input terminal 11 is transmitted to a video signal processing circuit 13. The video signal processing circuit 13 receives a signal from a modulation signal processing circuit 14 and modulates the video signal as necessary. An audio signal supplied to the audio input terminal 12 is transmitted to an audio signal processing circuit 15. The audio signal processing circuit 15 receives the signal from the modulation signal generating circuit 14 and modulates the audio signal as necessary.

Output signals of the video signal processing circuit 13 and audio signal processing circuit 15 are synthesized in the frequency arrangement of the TV signal by a synthesizing circuit 16. An output signal of the synthesizing circuit 16 is modulated in amplitude by a modulating circuit 17 and is also modulated to a TV frequency of VHF/UHF band. An output signal of the modulating circuit 17 is supplied to an output terminal 19 through a mixer/distributor 18. A CPU 20 is connected to the modulation signal generating circuit 14 and forms a necessary modulation signal by an instruction from the CPU 20. A memory device 21 is provided as memory means for the CPU 20. Since information obtained from the subscribers has been stored in the memory device 21 in the form of a data base, necessary information is retrieved from the memory device 21 and can be used for a service work to the subscriber.

An FSK demodulator 22 is connected to the mixer/distributor 18 and demodulates an FSK signal in an out-band (free channel other than the TV frequencies of the VHF/UHF bands) supplied to the output terminal 19 of the controller 10. A demodulated digital signal is transmitted to the CPU 20 and an instruction is generated from the CPU 20 as necessary.

For providing information to the respective subscribers from the center, the digital signal from the CPU 20 is modulated by an FSK modulator 23 and is transmitted to the subscriber side through the mixer/distributor 18 and output terminal 19 by using a frequency in the out-band by using an exclusive-use cable (not shown).

There are provided several to tens of controllers 10 and video equipment are provided in the center. Respective frequencies are allocated to video programs or music programs and those programs are transmitted. For example, channels are allocated every program in a manner such that channel 1 to channel 10 are allocated to movie programs, channel 11 to channel 20 are allocated to news programs, and channel 30 to channel 35 are allocated to music programs. Those programs are made open under the category of "program information". That is, the controller 10, video equipment, and the like shown in FIG. 1 show a part of the bidirectional CATV system.

Figure 2:
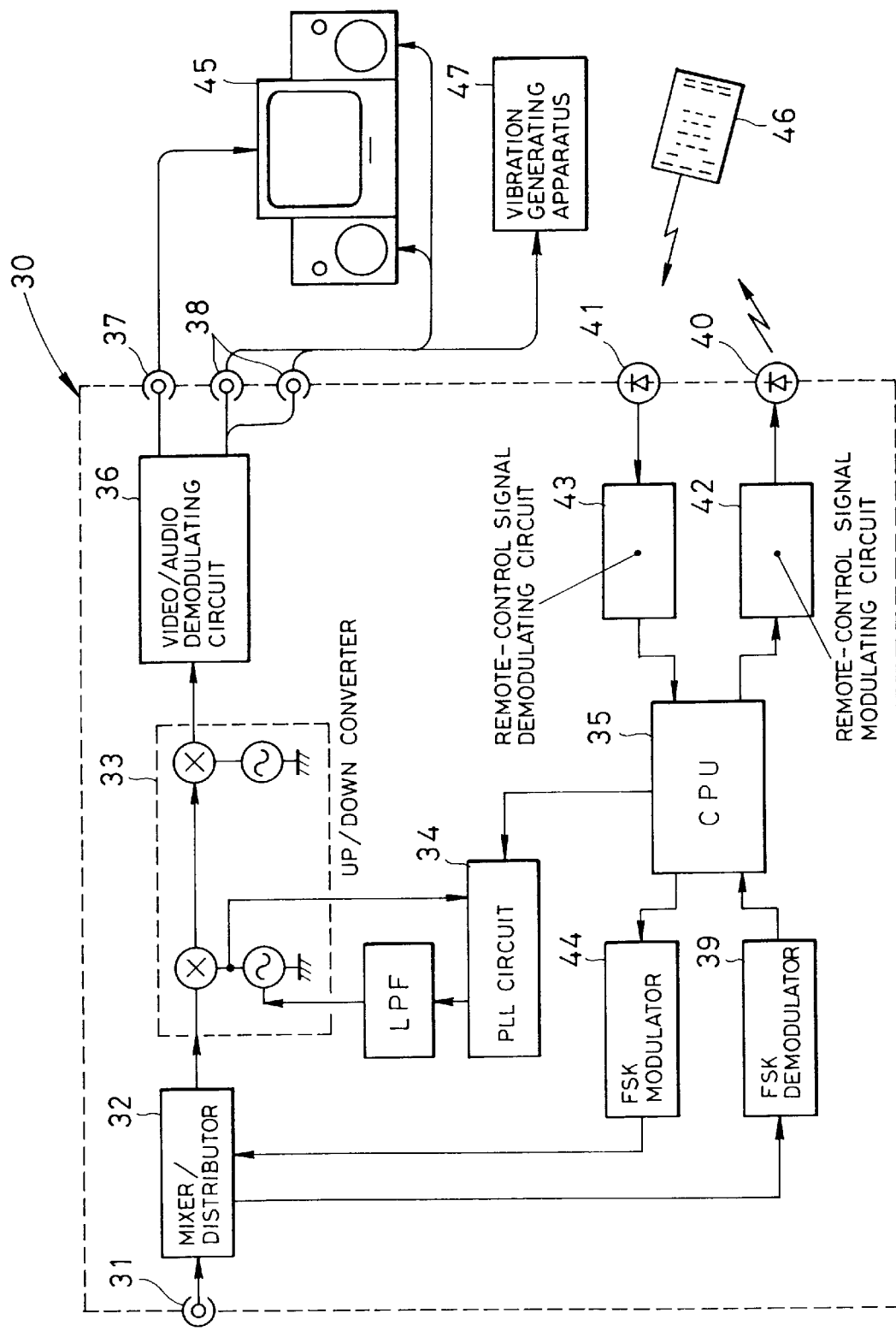
FIG. 2 is a block diagram of a terminal apparatus on the subscriber side in the embodiment of the invention.

FIG. 2 is a block diagram of a terminal apparatus on the subscriber side of the bidirectional CATV system in the invention. In FIG. 2, reference numeral 31 denotes an input terminal of a terminal apparatus 30. The input terminal 31 is connected to the center by an exclusive-use cable. A signal supplied to the input terminal 31 is transmitted to an up/down converter 33 through a mixer/distributor 32, controls a PLL circuit 34 by a CPU 35, selects a desired station, and is converted to a TV-IF signal. The signal converted to the TV-IF signal is demodulated by a video/audio demodulating circuit 36. The video signal is supplied to a video output terminal 37 and the audio signal is supplied to an audio input terminal 38, respectively. A TV receiver 45 in the house of the subscriber is connected to the video output terminal 37 and audio input terminal 38. A vibrating apparatus for converting the audio signals to mechanical vibrations, namely, a vibration generating apparatus 47 in the form of a reclining chair, a back-supporting cushion, a pillow, or the like is connected to the audio input terminal 38.

The FSK signal transmitted in the out-band is distributed by the mixer/distributor 32 and is supplied to an FSK demodulator 39. The FSK signal is demodulated by the FSK demodulator 39 and is supplied in a form of a digital signal to the CPU 35. A remote-control signal light emitting unit 40 and a remote-control signal photosensitive unit 41 are provided for the terminal apparatus 30. The remote-control signal light emitting unit 40 is provided to operate the TV receiver 45 of the subscriber by an instruction from the center. The instruction from the center is once transferred into the CPU 35, a digital signal from the CPU 35 is newly converted to a remote-control signal by a remote-control signal modulating circuit 42. The remote-control signal is generated from the remote-control signal light emitting unit 40. The remote-control signal that is operated by the subscriber is detected by the remote-control signal photosensitive unit 41. The detected remote-control signal is demodulated by a remote-control signal demodulating circuit 43 and is supplied to the CPU 35 in a form of a digital signal.

When the remote-control signal supplied to the CPU 35 indicates information to the center, the CPU 35 supplies the digital signal including necessary information together with the remote-control signal to an FSK modulator 44. The supplied signal is converted to a signal of the out-band in a form of the FSK signal and is transmitted to the center side through the mixer/distributor 32. ID numbers as identification numbers of the subscribers have been written in the CPU 35 and are annexed as necessary to the data that is sent to the center and the resultant data is transmitted.

It is well known that, as for the stress which a human being receives and the state of deep sleep, there is a close relation between the brain waves of an individual and his or her physiological and mental state. For example, when a person is in a relaxed state, lots of α (alpha) waves (about 8 to 13 Hz) are generated. When he or she is in an active state, lots of β waves (about 14 to 30 Hz) are generated. When he is in a sleepy state, lots of θ waves (about 4 to 7 Hz) are generated. On the contrary, when the human being is induced so as to generate lots of predetermined brain waves, he is likely to enter the corresponding physiological and mental state.

For instance, when the human being is induced to the relaxed state by sounds, in order to induce the α waves, sine waves or signals having the other waveforms of a specified frequency within a range of 8 to 13 Hz (frequency for inducing the relaxed state differs every person) are produced to be heard as sound.

In case of using the video signal, for example, a color of the whole TV picture plane is set to pale blue, the video signal of pale blue is blinked at a specified frequency within a range of 8 to 13 Hz, thereby enabling the human being to be induced to the relaxed state.

Figure 3:
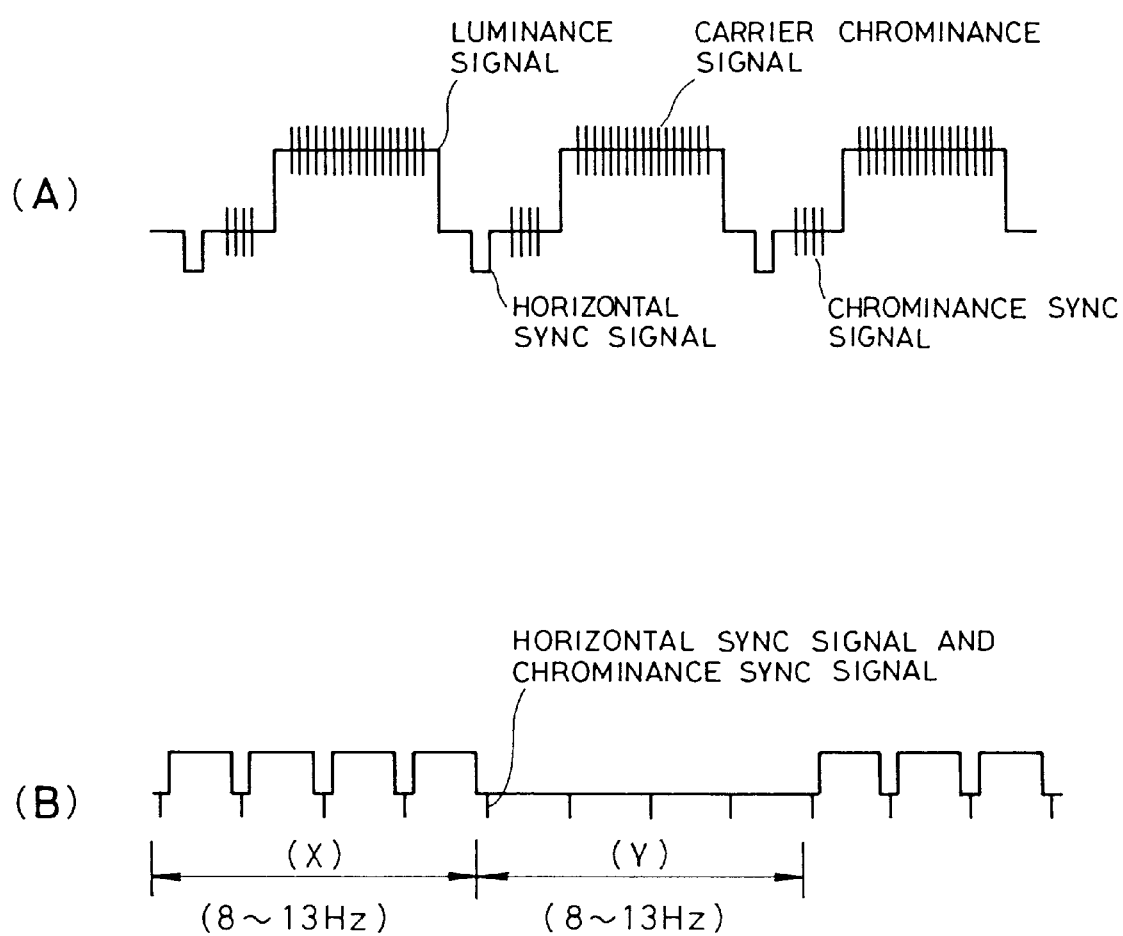
FIG. 3 is a waveform diagram showing a format of a TV video signal.

A portion (a) in FIG. 3 shows a construction of the video signal which is used in the controller 10 of the center. As shown in the portion (a) in FIG. 3, the video signal is constructed by: a horizontal sync signal to synchronize the signals; a chrominance sync signal; a vertical sync signal (not shown); a luminance signal indicative of brightness; a carrier chrominance signal indicative of a color; and the like.

In order to induce the relaxed state by the video signal, as mentioned above, it is necessary to blink the video signal at a specified frequency within a range of 8 to 13 Hz. As a method of blinking the video signal, when the whole video signal shown in the portion (a) in FIG. 3 is turned on or off, the horizontal and vertical sync signals are extinguished and the synchronization of the TV receiver of the subscriber is pulled out. In this instance, therefore, only the luminance signal and carrier chrominance signal are turned on or off.

That is, a portion (b) in FIG. 3 shows the ON/OFF state of the video signal when a time base of the video signal is compressed. A range of (X) in the portion (b) in FIG. 3 denotes an ON-state of the video signal (the carrier chrominance signal is omitted in the diagram) and a range of (Y) in the diagram indicates an OFF-state of the video signal. An ON/OFF period is set to a specified frequency within a range of 8 to 13 Hz.

As for the video signal for inducing the relaxed state, in the controller 10, a video blinking signal corresponding to an ON/OFF frequency, namely, a blinking frequency (8 to 13 Hz) is supplied from the modulation signal generating circuit 14 to the video signal processing circuit 13, thereby forming a signal in a form shown in the portion (b) in FIG. 3.

As a signal of sounds to induce the relaxed state, sine waves of a specified frequency within a range of 8 to 13 Hz are generated by the modulation signal generating circuit 14 and are supplied to the audio signal processing circuit 15. The contents of those modulation signals are processed by a n instruction from the CPU 35 on the basis of data of the subscriber recorded in the memory device 21.

Figure 4:
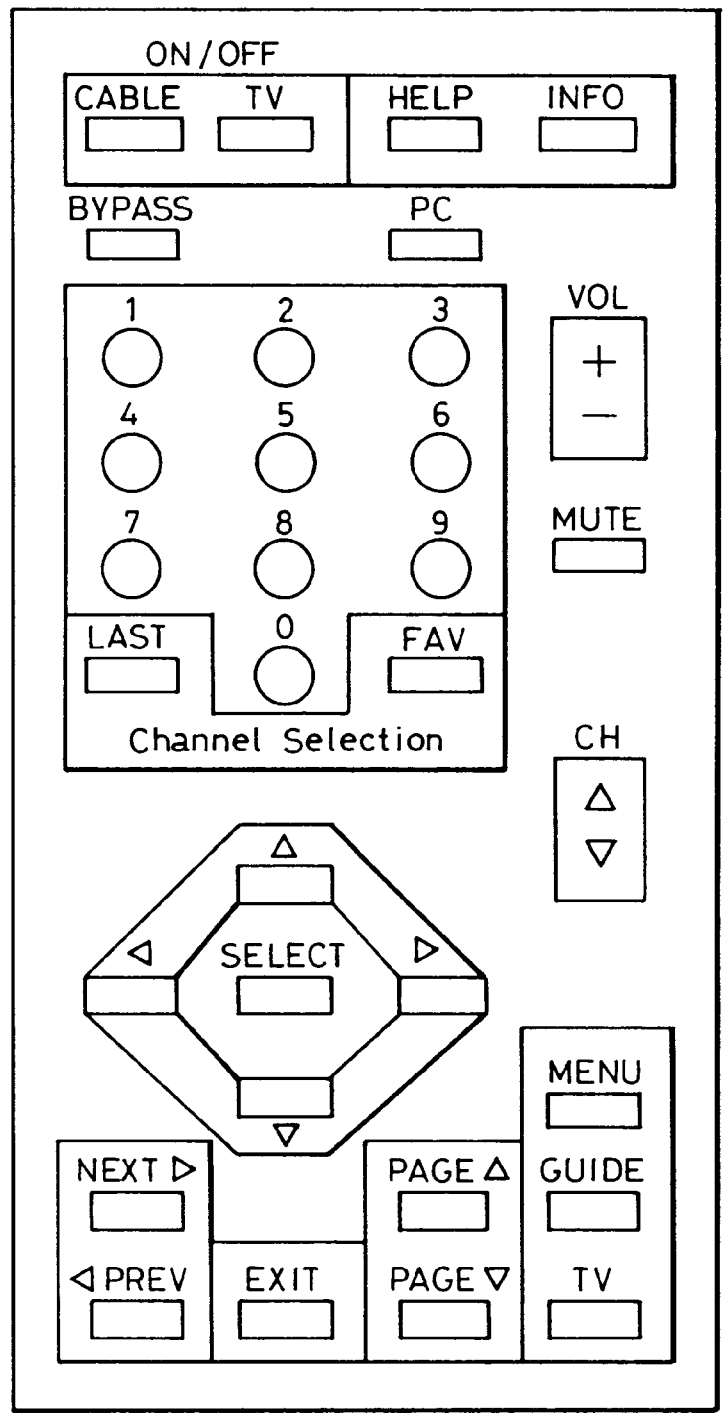
FIG. 4 is a diagram showing an operation panel of a remote controller.

The whole operation of the bidirectional CATV system will now be described with reference to FIGS. 1 to 5. As shown in FIG. 2, the terminal apparatus 30 connected to the center by the exclusive-use cable is arranged on the subscriber side. A remote controller 46 to operate the terminal apparatus 30 and TV receiver 45 is also equipped and an example of an operation panel of the remote controller 46 is shown in FIG. 4. When the subscriber wants to receive the sweet sleep service, in order to first turn on a power of the TV receiver 45 by the remote controller 46, an "ON/OFF" button on the operation panel of the remote controller 46 is depressed.

A power source of the TV receiver 45 is turned on by a remote-control signal demodulator (not shown) and a CPU (shot shown) provided in the TV receiver 45 through a remote-control photosensitive unit provided in the TV receiver 45. In this instance, the remote-control signal also reaches the remote-control signal photosensitive unit 41 provided in the terminal apparatus 30 and the signal demodulated by the remote-control signal demodulating circuit 43 is supplied to the CPU 35. The CPU 35 judges whether the received remote-control signal is a signal to the center or a signal to operate the TV receiver 45 and controls the terminal apparatus 30 as necessary.

When a "MENU" button on the operation panel of the remote controller 46 is depressed, for example, a menu picture plane as shown in FIG. 5 is shown on the screen of the power-on TV receiver 45. The menu picture plane is a menu related to the relaxation that is presented by the center and shows that, for instance, music programs with respect to the relief or elimination of stress are always under service from 16:00 to 20:00 at the channels 6 and 18. Similarly, a music program to improve a memory is also presented as a background music for students who study for examination. Although the sweet sleep service is presented by the channel 0, since characteristics regarding the sweet sleep differ every subscriber and it is necessary to present signals of the contents according to the data of the subscribers which has previously been registered, a time-reservation system is used.

In accordance with the using method of the sweet sleep service displayed on the menu picture plane, the subscriber operates the remote controller. That is, when the subscriber wants to receive the sweet sleep service for 15 minutes from 23:00 at night, a ten-key and an "INFO" button on the operation panel of the remote controller are depressed as follows.

"0", "INFO", 2300, "INFO", 2315, "INFO"

The remote-control signal reaches the remote-control signal photosensitive unit 41 provided for the terminal apparatus 30 and is demodulated by the remote-control signal demodulating circuit 43 and is supplied to the CPU 35 in a form of a digital signal. The CPU 35 judges that the obtained digital signal is a signal for requesting the "sweet sleep service" from "0" and "INFO" data included in the signal and supplies digital data to which the subscriber's ID No. is added together with digital codes for requesting "the sweet sleep service" and reservation time data to the FSK modulator 44. After the data was converted to the FSK signal, the FSK signal is transmitted to the center side at the frequency in the out-band through the mixer/distributor 32 and input terminal 31.

On the center side, the FSK signal supplied from the output terminal 19 of the controller 10 is distributed by the mixer/distributor 18 and is supplied to the FSK demodulator 22. The FSK signal is demodulated in the demodulator 22 and is supplied to the CPU 20 in a form of a digital signal. The CPU 20 judges that the supplied signal denotes the digital codes of the "sweet sleep service" from the digital codes of "0" and "INFO" included in the digital signal. The CPU 20 retrieves data corresponding to the ID No. included in the digital signal from the memory device 21, allows a designated time to be stored together with the sweet sleep data of the subscriber stored as a data base, and also sets the reservation time to a timer (not shown) built in the CPU 20.

When the program is charged for, since a video signal is generally scrambled, a scramble signal is supplied from the modulation signal generating circuit 14 to the controller 10 at the center. A scrambling process such that the sync signal of the video signal is compressed, or the like process, is executed in-band by the video signal processing circuit 13. The processed signal is synthesized with the audio signal and the resultant synthesis signal is transmitted.

When the time of "sweet sleep service" reserved by the subscriber comes, the CPU 20 reads out the data regarding the sweet sleep of the subscriber corresponding to the ID number from the memory device 21.

Assuming that the "sweet sleep data" of the subscriber, for example, subscriber A who requested the "sweet sleep service" to the center has been recorded in a manner such that, for instance, the color of the sweet sleep video signal is "blue", from the relax state to the sweet sleep state "10 Hz to 6 Hz", and sound "present", by an instruction from the CPU 20, a modulation signal to turn ON/OFF the video signal modulated by the carrier chrominance signal of "blue" by "changed from 10 Hz to 6 Hz" is supplied from the modulation signal generating circuit 14 to the video signal processing circuit 13.

The modulation signal is also similarly supplied from the modulation signal generating circuit 14 to the audio signal processing circuit 15 so as to change the sine wave frequency of "10 Hz to 6 Hz".

When the "sweet sleep data" of the subscriber B who requested the "sweet sleep service" has been recorded in a manner such that, for example, the color of the sweet sleep video signal is "pale blue", the sweet sleep frequency is "5 Hz", and the sound "absence", the modulation signal to turn ON/OFF by "5 Hz" the video signal modulated by the carrier chrominance signal of "pale blue" is supplied to the video signal processing circuit 13. In this instance, however, no signal is supplied to the audio signal processing circuit 15.

In case of the foregoing subscriber A, when entering the sweet sleep state, there is the largest effect in case of a frequency "10 Hz" of the a wave in order to first induce the relax state. After that, "6 Hz" of the θ wave is desired in order to enter the sweet sleep state. It is necessary to vary the frequency which gradually reaches 6 Hz from 10 Hz. However, since the human nerve state before entering the sweet sleep state is generally in the active state, it is most effective to induce so as to gradually approach the frequency of the α wave of the subscriber from the frequency of the β wave (about 14 to 30 Hz) which is often generated in the active state.

Output signals of the video signal processing circuit 13 and audio signal processing circuit 15 which were modulated by the signal based on the "sweet sleep data" of the subscriber A are synthesized to a frequency arrangement of the TV signal by the synthesizing circuit 16. After that, the synthesis signal is amplitude modulated by the modulating circuit 17 and is converted into a signal of an arbitrary free channel of the TV frequency of the VHF/UHF band. An output signal of the modulating circuit 17 is transmitted from the output terminal 19 through the mixer/distributor 18.

At the same time, the CPU 20 allows the FSK modulator 23 to modulate the data in the free channel and the ID number which were set as mentioned above and transmits the modulated signal in a form of an FSK signal to the subscriber side.

The FSK signal transmitted from the output terminal 19 of the controller 10 is supplied to the terminal apparatus 30 of the subscriber through the cable, is distributed by the mixer/distributor 32, and is supplied to the FSK demodulator 39. The FSK signal is converted into the digital signal and supplied to the CPU 35. The CPU 35 reads the designated channel of the "sweet sleep service" included in the digital signal. Together with the power-on data of the TV receiver 45, the remote-control signal is generated from the remote-control signal light emitting unit 40 through the remote-control signal converting circuit 42 to the CPU 35. The power source of the TV receiver 45 of the subscriber is turned on. On the basis of the data of the designated channel which was subsequently generated, the station of the TV receiver 45 is automatically selected to the "sweet sleep service" channel.

The whole surface of the screen of the TV receiver 45 of the subscriber is set to blue and the picture plane is on/off controlled, namely, blinked at a frequency which gradually reaches 6 Hz from 10 Hz.

A monotonous sound of a frequency which gradually reaches 6 Hz from 10 Hz is generated from the speaker of the TV receiver 45. A monotonous sound modulated by a frequency which gradually reaches 6 Hz from 10 Hz is generated from the vibration generating apparatus 47 installed in the subscriber's home. Since the devices having forms such as reclining chair, back-supporting cushion, pillow, etc. are prepared for the vibration generating apparatus 47 as mentioned above, the vibration generating apparatus 47 can be used for both or either one of the sound and the vibration. When the designated time elapses, since the FSK signal to turn off the TV receiver 45 is transmitted from the center, the power source of the TV receiver 45 of the subscriber is automatically turned off by the remote-control signal generated from the remote-control signal light emitting unit 40 of the terminal apparatus 30. As mentioned above, the subscriber can get the sweet sleep service by merely reserving the time. In the ordinary life, the subscriber may enter the bed at a predetermined time and wait for the coming of the reserved time while reading a book or may go to sleep with the eyes closed. The subscriber can see the morning in the sweet sleep state.

To induce into the sweet sleep state as mentioned above, first by inducing the relax state by using the α wave and, after that, by inducing into the sweet sleep state by using the θ wave, the subscriber is likely to enter the corresponding physiological and mental state. Since there is an individual difference among those frequencies, however, it is necessary to get data per individual and to register into the data base at the center.

As a method of getting such data, it is possible to install the sweet sleep apparatus at the center and to detect the optimum conditions between the center and the subscriber or it is also possible to accumulate data in a form of questionnaire such as "could sleep comfortably or not?" in the menu picture plane.

The embodiment of the invention has been described above with respect to the example in which the frequency at which the sweet sleep is induced is gradually allowed to approach the frequency of the α wave of the subscriber from the β wave in the active state and, further, the frequency is changed to the frequency of the θ wave. There are, however, a subscriber who enters the sweet sleep from the relax state by only one frequency in the α wave and a subscriber who enters the sweet sleep by only the θ wave from the beginning. The conditions according to the characteristics of the subscriber are selected. The invention is not limited to the numerical value of the frequency or the shifting method of the frequency.

Although the embodiment of the invention has been described with respect to the example in which the color signal of "blue" is used as a video signal to induce the sweet sleep state, it is sufficient to turn on/off the video signal by the frequency according to the characteristics of the subscriber. It is also possible to use the signal of "white" or a still image. The invention is not limited to the contents of the video signal.

Although the method of the sweet sleep service has been described with respect to the method whereby the power-on of the TV receiver of the subscriber, the setting of the reservation time, or the like is transmitted in a form of the FSK signal by using the out-band, the subscriber can turn on the power source of the TV receiver by himself or can set the reservation time by using a telephone line.

As another embodiment of the bidirectional signal distributing system, a system using a satellite or a system (for example, the internet) using telephones is considered and the invention is not limited to the foregoing embodiment.

According to the embodiment of the invention, in the bidirectional signal distributing system, the luminance change frequency data and/or audio change frequency data adapted to the shift to the sweet sleep state of the subscriber has been stored on the head end side. When the subscriber requests the sweet sleep function, the luminance change frequency data and/or audio change frequency data according to the subscriber provided on the head end side is read out, the predetermined video signal and/or audio signal is modulated, and the resultant modulated signal is transmitted to the subscriber. The subscriber, therefore, can receive the sweet sleep service under the conditions which are optimum to himself at home without purchasing the sweet sleep apparatus.

Since the modulating means can blink the video signal and can change the blinking frequency so as to gradually approach the frequency of the α wave of the brain waves of the subscriber, the subscriber can receive the sweet sleep service under the conditions which are optimum to himself.

Although the present invention has been described above with reference to the preferred embodiments, many modifications and variations are further possible by those with ordinary skill in the art and all of such modifications and variations fall within the scope of the appended claims.

What is claimed is:

1. A bidirectional signal distributing system comprising:
    a remote head end apparatus including
        memory means in which at least one of luminance change frequency data and audio change frequency data suitable for a shift to a sweet sleep state of a subscriber is stored,
        signal generating means for generating at least one of predetermined video signal and audio signal, and
        modulating means for modulating said at least one of video signal and audio signal from said signal generating means in accordance with at least one of said luminance change frequency data and audio change frequency data in said memory means; and
    a local subscriber apparatus including request signal generating means for generating a request signal to request a sweet sleep function from the head end apparatus,
    wherein when the request signal is generated by said request signal generating means, at least one of said luminance change frequency data and audio change frequency data according to the subscriber is read out from said memory means in said remote head end apparatus, and said modulating means modulates at least one of said predetermined video signal and audio signal by said frequency data and transmits said modulated signal to said local subscriber apparatus.

2. A system according to claim 1, wherein said modulating means blinks said video signal.

3. A system according to claim 2, wherein said modulating means changes a blinking frequency so as to gradually approach a frequency of an α wave of the subscriber.

4. A system according to claim 1, wherein said video signal is a blue background signal, a white signal, or a still image.

5. A system according to claim 1, wherein said audio frequency data is changed so as to gradually approach a frequency of an α wave of the subscriber.

6. A system according to claim 1, wherein said request signal generating means transmits a control signal that is transmitted by a key operation of a remote-control apparatus to said head end side by an out-band frequency.

7. A bidirectional signal distributing system comprising:
    a remote head end apparatus including
        a memory for storing user-specific data according to a subscriber, wherein the memory comprises a plurality of memory locations, each containing user-specific data according to one of a plurality of subscribers,
        a signal generator for generating at least one of a video signal, and an audio signal, and
        a modulator for modulating at least one of the video signal, and audio signal, in accordance with the user-specific data to generate a user-specific programming signal that correlates with a desired brainwave frequency of the subscriber;
    a local subscriber apparatus including
        a request transmitter circuit for generating and transmitting a request for the user-specific programming signal that correlates with a desired brainwave frequency of the subscriber, and
        a demodulator circuit for demodulating the user-specific programming signal from the remote head end apparatus; and
    at least one of a viewing apparatus, listening apparatus, and vibrating apparatus connected to the local subscriber apparatus for operation according to the user-specific programming signal from the remote head end apparatus.

8. The bidirectional signal distributing system according to claim 7, wherein a request for a user-specific programming signal is supplied by a remote control signal from a remote controller.

9. The bidirectional signal distributing system according to claim 8, wherein a request to adjust at least one of the viewing apparatus, listening apparatus, or vibrating apparatus is supplied by a remote control signal from the remote controller.

10. The bidirectional signal distributing system according to claim 9, wherein the local subscriber apparatus is programmable to request a desired beginning time and an ending time for the user-specific programming signal.

11. The bidirectional signal distributing system according to claim 7, wherein the user-specific data in the memory corresponds to sweet sleep data for inducing a relaxing feeling in a subscriber by altering a television signal from the viewing apparatus to blink at a frequency that correlates with a desired brainwave frequency.

12. The bidirectional signal distributing system according to claim 7, wherein the user-specific data in the memory corresponds to sweet sleep data for inducing a relaxing feeling in a subscriber by altering a radio signal to generate a monotonous sound at a frequency that correlates with a desired brainwave frequency.

13. The bidirectional signal distributing system according to claim 7, wherein the user-specific data in the memory corresponds to sweet sleep data for inducing a relaxing feeling in a subscriber by altering a vibrating apparatus to vibrate at a frequency that correlates with a desired brainwave frequency.

* * * * *